(12) United States Patent
Liebchen

(10) Patent No.: US 8,149,877 B2
(45) Date of Patent: *Apr. 3, 2012

(54) APPARATUS AND METHOD OF ENCODING AND DECODING AUDIO SIGNAL

(75) Inventor: Tilman Liebchen, Berlin (DE)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/232,741

(22) Filed: Sep. 23, 2008

(65) Prior Publication Data

US 2009/0037183 A1 Feb. 5, 2009

Related U.S. Application Data

(63) Continuation of application No. 11/481,926, filed on Jul. 7, 2006.

(60) Provisional application No. 60/697,551, filed on Jul. 11, 2005, provisional application No. 60/700,570, filed on Jul. 19, 2005.

(30) Foreign Application Priority Data

| Jul. 16, 2005 | (WO) | PCT/KR2005/002290 |
| Jul. 16, 2005 | (WO) | PCT/KR2005/002291 |
| Jul. 16, 2005 | (WO) | PCT/KR2005/002292 |
| Jul. 18, 2005 | (WO) | PCT/KR2005/002306 |
| Jul. 18, 2005 | (WO) | PCT/KR2005/002307 |
| Jul. 18, 2005 | (WO) | PCT/KR2005/002308 |

(51) Int. Cl.
*H04J 3/18* (2006.01)
*G10L 19/00* (2006.01)

(52) U.S. Cl. .......... 370/477; 704/500; 704/501
(58) Field of Classification Search .......... None
See application file for complete search history.

(56) References Cited

U.S. PATENT DOCUMENTS

| 4,110,571 A | 8/1978 | Hills |
| 4,922,537 A | 5/1990 | Frederiksen |
| 5,089,818 A | 2/1992 | Mahieux et al. |
| 5,166,686 A | 11/1992 | Sugiyama |
| 5,243,686 A | 9/1993 | Tokuda et al. |
| 5,283,780 A | 2/1994 | Schuchmann et al. |
| 5,394,473 A | 2/1995 | Davidson |

(Continued)

FOREIGN PATENT DOCUMENTS

CN 1118196 3/1996

(Continued)

OTHER PUBLICATIONS

ISO/IEC JTC 1/SC 29/WG 11/N6435 "WD3 of ISO/IEC 14496-3:2001/AMD 4, Audio Lossless Coding (ALS)" Mar. 2004, Munich, Germany.*

(Continued)

*Primary Examiner* — John Blanton
(74) *Attorney, Agent, or Firm* — Harness, Dickey & Pierce

(57) ABSTRACT

In one embodiment, the method includes receiving audio frame data having at least first and second channel data. The first and second channel data includes a plurality of blocks, where the blocks are classified by a block type. Block information indicating the block type is obtained. The block information corresponds to the first and second channel data being common when the first and second channel data are paired. The first and second channel data is lossless decoded based on the block information.

3 Claims, 6 Drawing Sheets

U.S. PATENT DOCUMENTS

| | | | |
|---|---|---|---|
| 5,751,773 | A | 5/1998 | Campana, Jr. |
| 5,828,784 | A | 10/1998 | Miyashita et al. |
| 5,864,801 | A | 1/1999 | Sugiyama et al. |
| 5,899,970 | A | 5/1999 | Sonohara |
| 5,915,066 | A | 6/1999 | Katayama |
| 6,041,302 | A | 3/2000 | Bruekers |
| 6,052,661 | A | 4/2000 | Yamaura et al. |
| 6,069,947 | A | 5/2000 | Evans et al. |
| 6,098,039 | A | 8/2000 | Nishida |
| 6,104,996 | A | 8/2000 | Yin |
| 6,124,895 | A | 9/2000 | Fielder |
| 6,154,549 | A | 11/2000 | Arnold et al. |
| 6,226,608 | B1 | 5/2001 | Fielder et al. |
| 6,278,900 | B1 | 8/2001 | Aihara |
| 6,300,888 | B1 | 10/2001 | Chen et al. |
| 6,366,960 | B1 | 4/2002 | Hawkes |
| 6,420,980 | B1 | 7/2002 | Ejima |
| 6,628,714 | B1 | 9/2003 | Fimoff et al. |
| 6,675,148 | B2 | 1/2004 | Hardwick |
| 6,678,332 | B1 | 1/2004 | Gardere et al. |
| 6,690,307 | B2 | 2/2004 | Karczewicz |
| 6,691,082 | B1 | 2/2004 | Aguilar et al. |
| 6,696,993 | B2 | 2/2004 | Karczewicz |
| 6,775,254 | B1 | 8/2004 | Willenegger et al. |
| 6,813,602 | B2 | 11/2004 | Thyssen |
| 6,816,491 | B1 * | 11/2004 | Fujii et al. .................. 370/394 |
| 6,950,603 | B1 | 9/2005 | Isozaki et al. |
| 6,970,479 | B2 | 11/2005 | Abrahamsson et al. |
| 7,003,451 | B2 | 2/2006 | Kjörling et al. |
| 7,069,223 | B1 | 6/2006 | Matsumoto et al. |
| 7,085,401 | B2 | 8/2006 | Averbuch et al. |
| 7,096,481 | B1 | 8/2006 | Forecast et al. |
| 7,145,484 | B2 | 12/2006 | Moriya et al. |
| 7,203,638 | B2 | 4/2007 | Jelinek et al. |
| 7,266,501 | B2 | 9/2007 | Saunders et al. |
| 7,292,902 | B2 | 11/2007 | Smithers et al. |
| 7,392,195 | B2 | 6/2008 | Fejzo |
| 7,542,905 | B2 | 6/2009 | Kondo |
| 2001/0025358 | A1 | 9/2001 | Eidson et al. |
| 2002/0049586 | A1 | 4/2002 | Nishio et al. |
| 2002/0165710 | A1 | 11/2002 | Ojanpera |
| 2003/0033569 | A1 | 2/2003 | Middelink et al. |
| 2003/0078687 | A1 | 4/2003 | Du Breuil |
| 2003/0115051 | A1 | 6/2003 | Chen et al. |
| 2003/0125933 | A1 | 7/2003 | Saunders et al. |
| 2003/0138157 | A1 | 7/2003 | Schwartz |
| 2004/0016116 | A1 | 1/2004 | Yeh et al. |
| 2004/0037461 | A1 | 2/2004 | Lainema |
| 2004/0049379 | A1 | 3/2004 | Thumpudi et al. |
| 2004/0076333 | A1 | 4/2004 | Zhang et al. |
| 2004/0117044 | A1 | 6/2004 | Konetski |
| 2004/0161116 | A1 | 8/2004 | Tsuji et al. |
| 2004/0196913 | A1 | 10/2004 | Chakravarthy et al. |
| 2004/0247035 | A1 | 12/2004 | Schroder et al. |
| 2005/0015259 | A1 | 1/2005 | Thumpudi et al. |
| 2005/0063368 | A1 | 3/2005 | Reznik |
| 2005/0071027 | A1 | 3/2005 | Prakash et al. |
| 2005/0080829 | A1 | 4/2005 | Reznik |
| 2005/0149322 | A1 | 7/2005 | Bruhn et al. |
| 2005/0152557 | A1 | 7/2005 | Sasaki et al. |
| 2005/0216262 | A1 | 9/2005 | Fejzo |
| 2005/0254281 | A1 | 11/2005 | Sawabe et al. |
| 2006/0013405 | A1 | 1/2006 | Oh et al. |
| 2006/0174267 | A1 | 8/2006 | Schmidt |
| 2006/0251330 | A1 | 11/2006 | Toth et al. |
| 2008/0075153 | A1 | 3/2008 | Roberts et al. |
| 2009/0030700 | A1 | 1/2009 | Liebchen |

FOREIGN PATENT DOCUMENTS

| | | |
|---|---|---|
| CN | 1195940 | 10/1998 |
| CN | 1495705 | 5/2004 |
| EP | 0 599 825 A2 | 6/1994 |
| EP | 691751 A1 | 1/1996 |
| EP | 1 047 047 A2 | 10/2000 |
| EP | 1054575 A2 | 11/2000 |
| EP | 1 074 976 A2 | 2/2001 |
| EP | 1 142 130 | 4/2003 |
| EP | 1359755 A1 | 11/2003 |
| EP | 1391880 A2 | 2/2004 |
| EP | 1 427 252 A1 | 6/2004 |
| EP | 1 074 976 | 10/2004 |
| GB | 2 318 029 A | 4/1998 |
| JP | 08-031096 A | 2/1996 |
| JP | 3-224130 | 8/2001 |
| JP | 2002-341896 | 11/2002 |
| JP | 2004-054156 A | 2/2004 |
| JP | 2004-072345 | 3/2004 |
| JP | 2008-532064 | 8/2008 |
| WO | WO 92/12607 A1 | 7/1992 |
| WO | WO 99/53479 A1 | 10/1999 |
| WO | WO 00/41313 A1 | 7/2000 |
| WO | WO 00/45389 A1 | 8/2000 |
| WO | WO 03/015419 | 2/2003 |
| WO | WO 03/049081 A1 | 6/2003 |
| WO | WO 03/085645 A1 | 10/2003 |
| WO | WO 03/090208 A1 | 10/2003 |
| WO | WO 2004/047305 | 6/2004 |
| WO | WO 2004/072956 A1 | 8/2004 |
| WO | WO 2005/036529 A1 | 4/2005 |
| WO | WO 2005/059899 | 6/2005 |

OTHER PUBLICATIONS

ISO/IEC JTC1/SC29/WG11/N7016, "Text of ISO/IEC 14496-3:2001/FPDAM 4, Audio Lossless Coding (ALS), new audio profiles and BSAC extensions," Jan. 2005, Hong Kong, China.

T.H. Tsai, et al., "A Novel MPEG-2 Audio Decoder with Efficient Data Arrangement and Memory Configuration," IEEE Transactions on Consumer Electronics, 43(3): 598-604, (1997).

Kamamoto, Yutaka, et al., "Lossless Compression of Multi-channel Signals Using Inter-channel Correlation," Transactions of Information Processing Society of Japan, 46(5): 1118-1128, (2005). (English Abstract).

International Search Report dated Jan. 4, 2007.
International Search Report dated Jan. 18, 2007.
International Search Report dated Jan. 18, 2007.
International Search Report dated Jan. 18, 2007.
International Search Report dated Feb. 2, 2007.
International Search Report dated Jan. 10, 2007.
International Search Report corresponding to Korean Application No. PCT/KR2006/002683 dated Oct. 16, 2006.
International Search Report corresponding to Korean Application No. PCT/KR2006/002687 dated Oct. 16, 2006.
International Search Report corresponding to Korean Application No. PCT/KR2006/002688 dated Oct. 16, 2006.
International Search Report corresponding to Korean Application No. PCT/KR2006/002685 dated Nov. 24, 2006.
International Search Report corresponding to Korean Application No. PCT/KR2006/002679 dated Jan. 4, 2007.
International Search Report corresponding to Korean Application No. PCT/KR2006/002690 dated Jan. 12, 2007.
International Search Report corresponding to Korean Application No. PCT/KR2006/002686 dated Jan. 18, 2007.

"An Introduction to MPEG-4 Audio Lossless Coding", Liebchen, T.; Acoustics, Speech, and Signal Processing, 2004. Proceedings. IEEE International Conference on vol. 3, May 17-21, 2004. pp. 1012-1015.

"MPEG-4 Lossless Coding for High-Definition Audio", Liebchen, T.; Audio Engineering Society Convention Paper, New York, NY, US. Oct. 10, 2003. Figure 3 and Chapter 3.4.

"MPEG Audio Layer II: A Generic Coding Standard for Two and Multichannel Sound for DVB, DAB and Computer Multimedia", Stoll, G.; International Broadcasting Convention, 1995 Amsterdam. pp. 136-144.

"Linear Prediction From Subbands for Lossless Audio Compression", Giurcaneanu C.D., Tabus I., Astola J.; NORSIG '98. 3$^{rd}$ IEEE NORDIC Signal Processing Symposium. Vigso, Denmark Jun. 8-11, 1998. pp. 225-228.

Office Action dated Oct. 20, 2009 by USPTO for counterpart U.S. Appl. No. 11/481,932.

Office Action dated Oct. 27, 2009 by USPTO for counterpart U.S. Appl. No. 11/481,926.

Office Action dated Sep. 14, 2009 by Japanese Patent Office for counterpart Japanese Application No. 2008-521316 (without translation).
ID3v2 Tag Specification, Mar. 1998.
ISO/IEC JTC 1/SC 29/WG11N6435 "WD3 of ISO/IEC 14496-3:2001/AMD 4, Audio Lossless Coding (ALS)" Mar. 2004, Munich, Germany.
Yamaha DME Designer Manual, Version 2.0, Copyright 2004.
US Office Action dated: Nov. 20, 2009, issued in corresponding U.S. Appl. No. 11/481,942.
US Office Action Dec. 1, 2009, issued in corresponding U.S. Appl. No. 12/232,527.
US Office Action Dec. 9, 2009, issued in corresponding U.S. Appl. No. 11/481,930.
US Office Action dated Jan. 15, 2010 in corresponding U.S. Appl. No. 12/232,783.
US Office Action dated Jan. 15, 2010 in corresponding U.S. Appl. No. 11/481,932.
Office Action dated Dec. 18, 2009 by USPTO for counterpart U.S. Appl. No. 11/481,933.
Office Action dated Dec. 24, 2009 by USPTO for counterpart U.S. Appl. No. 11/481,941.
US Office Action dated Feb. 23, 2010 in corresponding U.S. Appl. No. 12/232,527.
US Office Action dated Mar. 5, 2010 in corresponding U.S. Appl. No. 11/481,915.
US Office Action dated Mar. 29, 2010 in corresponding U.S. Appl. No. 11/481,939.
US Office Action dated Apr. 1, 2010 for corresponding U.S. Appl. No. 12/232,662.
US Office Action dated Apr. 8, 2010 for corresponding U.S. Appl. No. 11/481,932.
Search Report dated Jun. 2, 2010 by the European Patent Office for Application No. 06769225.1.
Liebchen, T, "Proposed Text of ISO/IEC 14496-3:2001/FPDAM 4, Audio Lossless Coding (ALS), new audio profiles and BSAC"—Hong Kong, Jan. 2005.
Liebchen T. "Proposed Study on ISO/IEC 14496-3:2001/FPDAM 4, Audio Lossless Coding (ALS), new audio profiles and BSAC"—Busan, Korea, Apr. 2005.
Office Action dated Jul. 30, 2010 from the Chinese Patent Office for Application No. 2006-80029407.
Liebchen, T. "MPEG-4 Lossless Coding for High-Definition Audio", Audio Engineering Society Convention Paper, Oct. 2003 New York.
Liebchen, T. "Improved Forward-Adaptive Prediction for MPEG-4 Audio Lossless Coding", Audio Engineering Society Convention Paper, May 2005, Barcelona.
Office Action dated Aug. 6, 2010 from the Chinese Patent Office for Application No. 2006-80025139.5.
European Search Report dated Sep. 29, 2010 for Application No. 06769223.6.
D Yang, et al "A Lossless Audio Compression Scheme with Random Access Property"—IEEE International Conference—Montreal, Canada May 2004.
U.S. Office Action dated Oct. 7, 2010 for U.S. Appl. No. 11/481,941.
US Office Action dated Nov. 17, 2010 for co-pending U.S. Appl. No. 11/481,915.
US Notice of Allowance dated Nov. 22, 2010 for co-pending U.S. Appl. No. 11/481,939.
Liebchen et al., "MPEG-4 ALS: an Emerging Standard for Lossless Audio Coding," ISO/IEC, DCC, 2004 (10 pages).
Liebchen et al., "Audio Engineering Society Convention Paper, MPEG-4 Audio Lossless Coding," Presented at the 116$^{th}$ Convention, May 8-11, 2004, Berlin, Germany, pp. 1-9.
West et al., "Finding an Optimal Segmentation for Audio Genre Classification," ISMIR, 2005 (8 pages).
Office Action dated Aug. 3, 2010 from the USPTO for U.S. Appl. No. 12/232,526.
US Office Action dated Dec. 7, 2010, issued in co-pending U.S. Appl. No. 12/232,734.
US Notice of Allowance dated Mar. 2, 2011, issued in co-pending U.S. Appl. No. 12/232,527.
European Office Action dated Apr. 20, 2011 for EP application No. 06 757 768.4.
"Study on 14496-3:2001/FPDAM 4, ALS", ITU Study Group 16—Video Coding Experts Group—ISO/IEC MPEG & ITU-T VCEG(ISO/IEC JTC1/SC29/WG11 and ITU-T SG16 16),89 pages, No. N7134 (May 6, 2005).
Chinese Office Action dated Aug. 12, 2010, with English translation.
Johnson, J.D. et al Article "Sum-Difference Stereo Transform Coding" —IEEE International Conference on Acoustics, Speech, and Signal Processing, vol. 2, pp. 569-572, 1992.
Chinese Gazette dated Nov. 9, 2011 in corresponding Chinese Application No. 20068025138.0.
Chinese Gazette dated Dec. 7, 2011 in corresponding Chinese Application No. 200680029407.0.

* cited by examiner

FIG. 6

APPARATUS AND METHOD OF ENCODING AND DECODING AUDIO SIGNAL

DOMESTIC PRIORITY INFORMATION

This application is a continuation of co-pending application Ser. No. 11/481,926 filed on Jul. 7, 2006, which claims the benefit of priority on U.S. Provisional Application Nos. 60/697,551 and 60/700,570 filed Jul. 11, 2005 and Jul. 19, 2005, respectively; the entire contents of all of which are hereby incorporated by reference.

FOREIGN PRIORITY INFORMATION

This application claims the benefit of priority on International PCT Application Nos. PCT/KR2005/002290, PCT/KR2005/002291, PCT/KR2005/002292, PCT/KR2005/002306, PCT/KR2005/002307 and PCT/KR2005/002308 filed Jul. 16, 2005, Jul. 16, 2005, Jul. 16, 2005, Jul. 18, 2005, Jul. 18, 2005 and Jul. 18, 2005, 2005, respectively, via the claim for priority on co-pending application Ser. No. 11/481,926; the entire contents of which are hereby incorporated by reference.

BACKGROUND OF THE INVENTION

The present invention relates to a method for processing audio signal, and more particularly to a method and apparatus of encoding and decoding audio signal.

The storage and replaying of audio signals has been accomplished in different ways in the past. For example, music and speech have been recorded and preserved by phonographic technology (e.g., record players), magnetic technology (e.g., cassette tapes), and digital technology (e.g., compact discs). As audio storage technology progresses, many challenges need to be overcome to optimize the quality and storability of audio signals.

For the archiving and broadband transmission of music signals, lossless reconstruction is becoming a more important feature than high efficiency in compression by means of perceptual coding as defined in MPEG standards such as MP3 or AAC. Although DVD audio and Super CD Audio include proprietary lossless compression schemes, there is a demand for an open and general compression scheme among content-holders and broadcasters. In response to this demand, a new lossless coding scheme has been considered as an extension to the MPEG-4 Audio standard. Lossless audio coding permits the compression of digital audio data without any loss in quality due to a perfect reconstruction of the original signal.

SUMMARY OF THE INVENTION

The present invention relates to method of processing an audio signal.

In one embodiment, at least first and second channels in a frame of the audio signal are independently subdivided into blocks if the first and second channels are not correlated with each other. The first and second channels are corresponding subdivided into blocks such that the lengths of the blocks into which the second channel is subdivided correspond to the lengths of the blocks into which the first channel is subdivided if the first and second channels are correlated with each other. First information may be generated to indicate the subdivision of the channel into the blocks, and the first information is generated commonly for first and second channels when the channels are correlated, and the first information is generated respectively for each of first and second channels when the channels are not correlated.

In one embodiment, the independently subdividing step and the correspondingly subdividing step both subdivide the first and second channels according to a subdivision hierarchy. The subdivision hierarchy has more than one level, and each level is associated with a different block length.

In one embodiment, the length of the first information is based on the number of levels in the subdivision hierarchy. For example, a length of the first information is 8 bits if the subdivision hierarchy includes up to three levels, the length of the first information is 16 bits if the subdivision hierarchy includes four levels, and the length of the first information is 32 bits if the subdivision hierarchy includes five levels.

Another embodiment further includes generating second information indicating a number of levels in the subdivision hierarchy.

In a further embodiment, the first information includes a number of information bits, and a first of the information bits indicates whether the first and second channels are independently subdivided or correspondingly subdivided.

In one embodiment, the independently subdividing step and the correspondingly subdividing step both subdivide the first and second channels according to a subdivision hierarchy. The subdivision hierarchy has more than one level, and each level is associated with a different block length.

In one embodiment, the first information is generated such that a length of the first information depends on a number of levels in the subdivision hierarchy.

In one embodiment, the method includes receiving audio frame data having at least first and second channel data. The first and second channel data includes a plurality of blocks, where the blocks are classified by a block type. Block information indicating the block type is obtained. The block information corresponds to the first and second channel data being common when the first and second channel data are paired. The first and second channel data is lossless decoded based on the block information.

The present invention further relates to methods and apparatuses for encoding an audio signal, and to methods and apparatuses for decoding an audio signal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is an example illustration of block switching methods for a plurality of channel according to embodiments of the present invention.

DETAILED DESCRIPTION OF EXAMPLE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

In a lossless audio coding method, since the encoding process has to be perfectly reversible without loss of information, several parts of both encoder and decoder have to be implemented in a deterministic way.

Codec Structure

Figure 1:
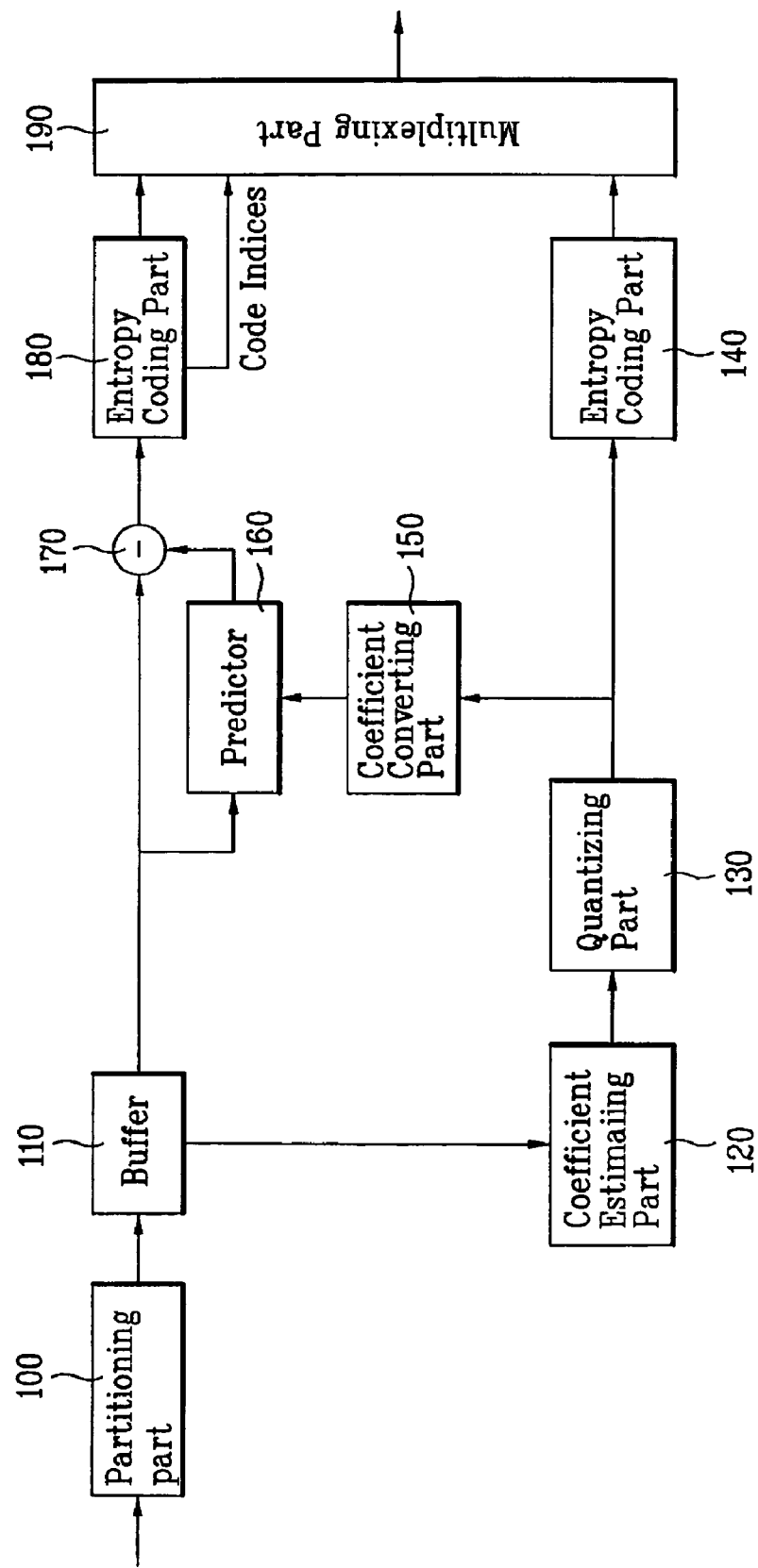
FIG. 1 is an example illustration of an encoder according to an embodiment of the present invention.

FIG. 1 is an example illustration of an encoder 1 according to the present invention.

A partitioning part 100 partitions the input audio data into frames. Within one frame, each channel may be further subdivided into blocks of audio samples for further processing. A buffer 110 stores block and/or frame samples partitioned by the partitioning part 100.

A coefficient estimating part 120 estimates an optimum set of coefficient values for each block. The number of coefficients, i.e., the order of the predictor, can be adaptively chosen as well. The coefficient estimating part 120 calculates a set of parcor values for the block of digital audio data. The parcor value indicates parcor representation of the predictor coefficient. A quantizing part 130 quantizes the set of parcor values.

A first entropy coding part 140 calculates parcor residual values by subtracting an offset value from the parcor value, and encodes the parcor residual values using entropy codes defined by entropy parameters, wherein the offset value and the entropy parameters are chosen from an optimal table. The optimal table is selected from a plurality of tables based on a sampling rate of the block of digital audio data. The plurality of tables are predefined for a plurality of sampling rate ranges, respectively, for optimal compression of the digital audio data for transmission.

A coefficient converting part 150 converts the quantized parcor values into linear predictive coding (LPC) coefficients. A predictor 160 estimates current prediction values from the previous original samples stored in the buffer 110 using the linear predictive coding coefficients. A subtracter 170 calculates a prediction residual of the block of digital audio data using an original value of digital audio data stored in the buffer 110 and a prediction value estimated in the predictor 160.

A second entropy coding part 180 codes the prediction residual using different entropy codes and generates code indices. The indices of the chosen codes will be transmitted as auxiliary information. The second entropy coding part 180 may code the prediction residual using one of two alternative coding techniques having different complexities. One coding technique is the well-known Golomb-Rice coding (herein after simply "Rice code") method and the other is the well-known Block Gilbert-Moore Codes (herein after simply "BGMC") method. Rice codes have low complexity yet are efficient. The BGMC arithmetic coding scheme offers even better compression at the expense of a slightly increased complexity compared to Rice codes.

Finally, a multiplexing part 190 multiplexes coded prediction residual, code indices, coded parcor residual values, and other additional information to form a compressed bitstream. The encoder 1 also provides a cyclic redundancy check (CRC) checksum, which is supplied mainly for the decoder to verify the decoded data. On the encoder side, the CRC can be used to ensure that the compressed data are losslessly decodable.

Additional encoding options include flexible block switching scheme, random access and joint channel coding. The encoder 1 may use these options to offer several compression levels with different complexities. The joint channel coding is used to exploit dependencies between channels of stereo or multi-channel signals. This can be achieved by coding the difference between two channels in the segments where this difference can be coded more efficiently than one of the original channels. These encoding options will be described in more detail below after a description of an example decoder according to the present invention.

Figure 2:
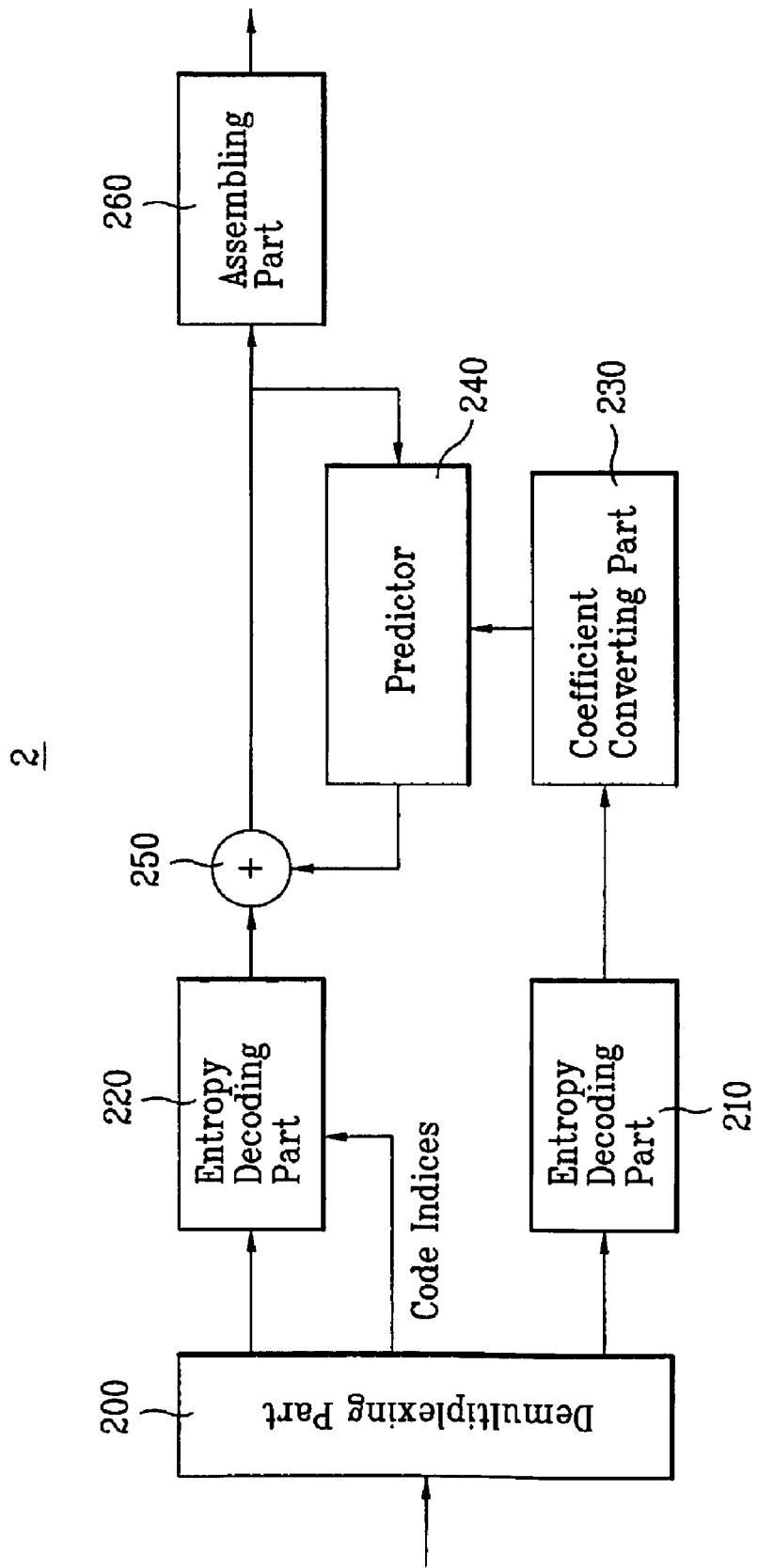
FIG. 2 is an example illustration of a decoder according to an embodiment of the present invention.

FIG. 2 is an example illustration of a decoder 2 according to the present invention. More specially, FIG. 2 shows the lossless audio signal decoder which is significantly less complex than the encoder, since no adaptation has to be carried out.

A demultiplexing part 200 receives an audio signal and demultiplexes a coded prediction residual of a block of digital audio data, code indices, coded parcor residual values and other additional information. A first entropy decoding part 210 decodes the parcor residual values using entropy codes defined by entropy parameters and calculates a set of parcor values by adding offset values to the decoded parcor residual values; wherein the offset value and the entropy parameters are chosen from a table selected by the decoder from a plurality of tables based on a sampling rate of the block of digital audio data. A second entropy decoding part 220 decodes the demultiplexed coded prediction residual using the code indices. A coefficient converting part 230 converts the entropy decoded parcor value into LPC coefficients. A predictor 240 estimates a prediction residual of the block of digital audio data using the LPC coefficients. An adder 250 adds the decoded prediction residual to the estimated prediction residual to obtain the original block of digital audio data. An assembling part 260 assembles the decoded block data into frame data.

Therefore, the decoder 2 decodes the coded prediction residual and the parcor residual values, converts the parcor residual values into LPC coefficients, and applies the inverse prediction filter to calculate the lossless reconstruction signal. The computational effort of the decoder 2 depends on the prediction orders chosen by the encoder 1. In most cases, real-time decoding is possible even on low-end systems.

Figure 3:
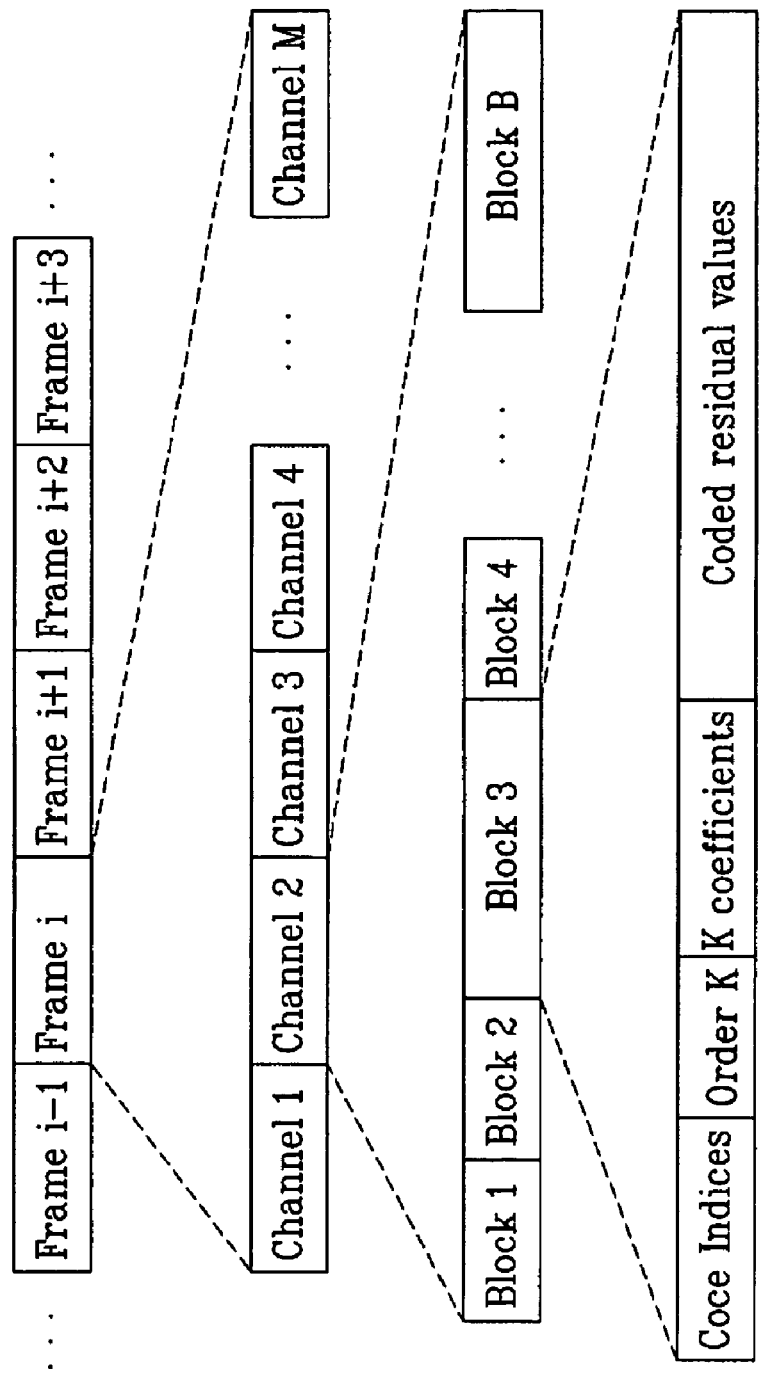
FIG. 3 is an example illustration of a bitstream structure of a compressed M-channel file according to an embodiment of the present invention.

FIG. 3 is an example illustration of a bitstream structure of a compressed audio signal including a plurality of channels (e.g., M channels) according to the present invention.

The bitstream consists of at least one audio frame including a plurality of channels (e.g., M channels). The "channels" field in the bitstream configuration syntax (see Table 6 below) indicates the number of channels. Each channel is sub-divided into a plurality of blocks using the block switching scheme according to present invention, which will be described in detail later. Each sub-divided block has a different size and includes coding data according to the encoding of FIG. 1. For example, the coding data within a subdivided block contains the code indices, the prediction order K, the predictor coefficients, and the coded residual values. If joint coding between channel pairs is used, the block partition is identical for both channels, and blocks are stored in an interleaved fashion. A "js_stereo" field in the bitstream configuration syntax (Table 6) indicates whether joint stereo (channel difference) is on or off, and a "js_switch" field in the frame_data syntax (See Table 7 below) indicates whether joint stereo (channel difference) is selected. Otherwise, the block partition for each channel is independent.

Hereinafter, the block switching, random access, prediction, and entropy coding options previously mentioned will now be described in detail with reference to the accompanying drawings and syntaxes that follow.

Block Switching

An aspect of the present invention relates to subdividing each channel into a plurality of blocks prior to using the actual coding scheme. Hereinafter, the block partitioning (or subdividing) method according to the present invention will be referred to as a "block switching method".

Hierarchical Block Switching

Figure 4:
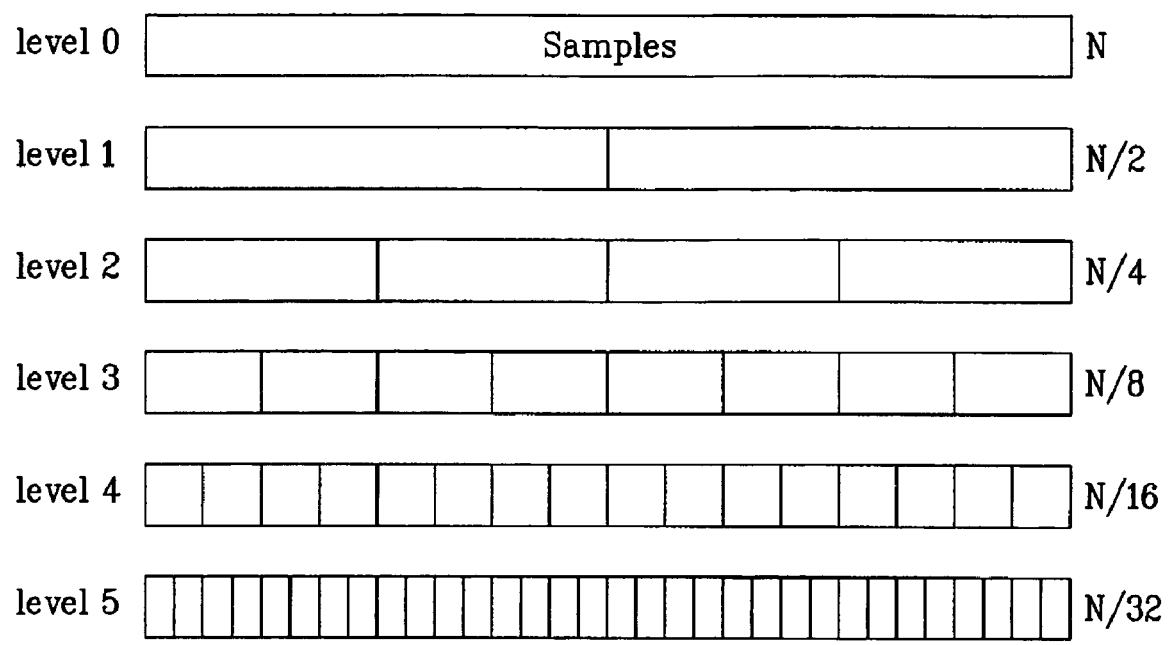
FIG. 4 is an example illustration of a conceptual view of a hierarchical block switching method according to an embodiment of the present invention.

FIG. 4 is an example illustration of a conceptual view of a hierarchical block switching method according to the present invention. For example, FIG. 4 illustrates a method of hierarchically subdividing one channel into 32 blocks. When a plurality of channels is provided in a single frame, each channel may be subdivided (or partitioned) to up to 32 blocks, and the subdivided blocks for each channel configure a frame.

Accordingly, the block switching method according to the present invention is performed by the partitioning part 100 shown in FIG. 1. Furthermore, as described above, the prediction and entropy coding are performed on the subdivided block units.

In general, conventional Audio Lossless Coding (ALS) includes a relatively simple block switching mechanism. Each channel of N samples is either encoded using one full length block ($N_B$=N) or four blocks of length $N_B$=N/4 (e.g., 1:4 switching), where the same block partition applies to all channels. Under some circumstances, this scheme may have some limitations. For example, while only 1:1 or 1:4 switching may be possible, different switching (e.g., 1:2, 1:8, and combinations thereof) may be more efficient in some cases. Also in conventional ALS, switching is performed identically for all channels, although different channels may benefit from different switching (which is especially true if the channels are not correlated).

Figure 5:
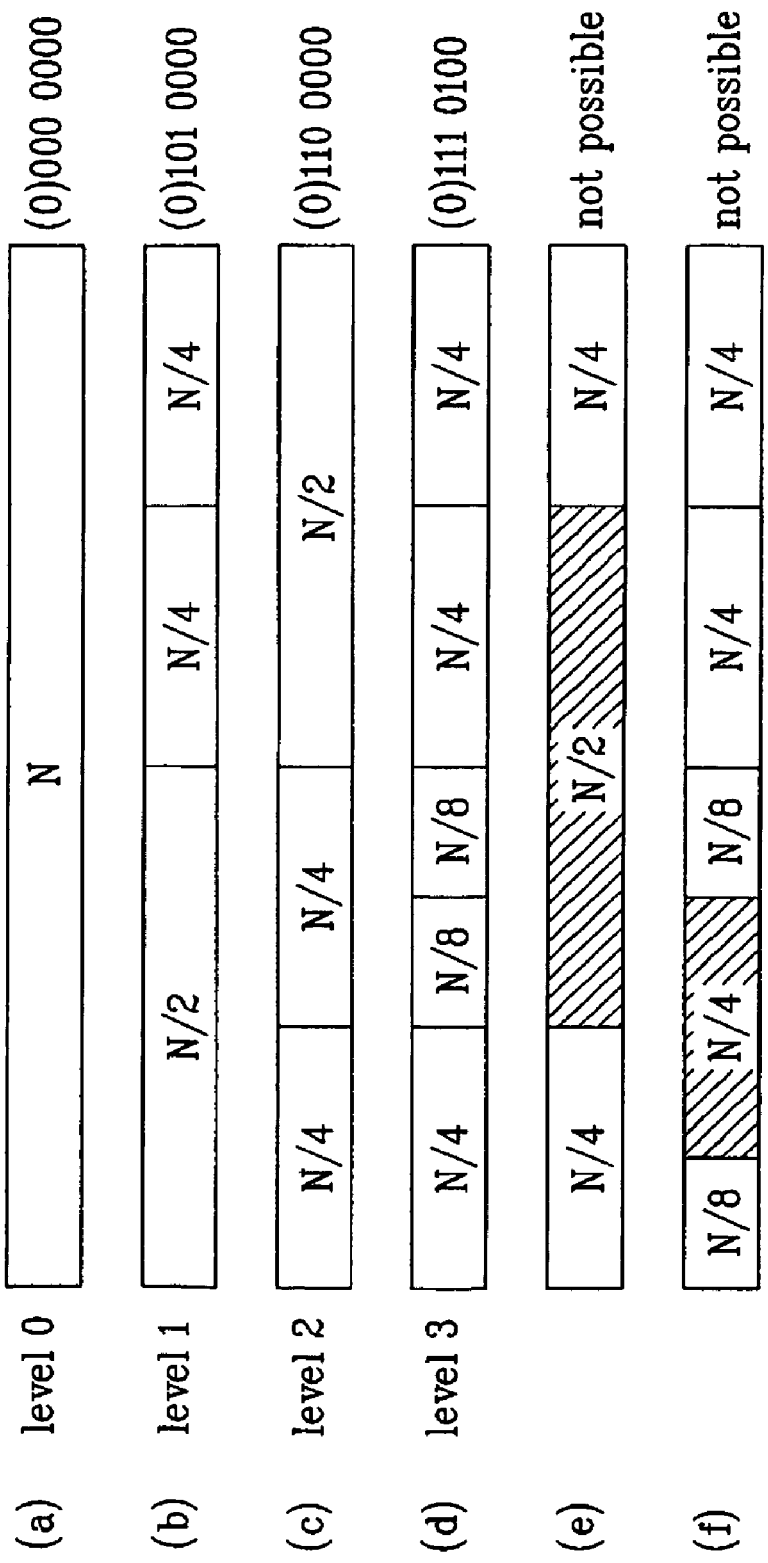
FIG. 5 is an example illustration of a block switching examples and corresponding block switching information codes.

Therefore, the block switching method according to embodiments of the present invention provide relatively flexible block switching schemes, where each channel of a frame may be hierarchically subdivided into a plurality of blocks. For example, FIG. 4 illustrates a channel which can be hierarchically subdivided to up to 32 blocks. Arbitrary combinations of blocks with $N_B$=N, N/2, N/4, N/8, N/16, and N/32 may be possible within a channel according to the presented embodiments, as long as each block results from a subdivision of a superordinate block of double length. For example, as illustrated in the example shown in FIG. 4, a partition into N/4+N/4+N/2 may be possible, while a partition into N/4+N/2+N/4 may not be possible (e.g., block switching examples shown in FIGS. 5(e) and 5 described below). Stated another way, the channel is divided into the plurality of blocks such that each block has a length equal to one of, $$N/(m^i) \text{ for } i=1, 2, \ldots p,$$

where N is the length of the channel, m is an integer greater than or equal to 2, and p represents a number of the levels in the subdivision hierarchy.

Accordingly, in embodiments of the present invention, a bitstream includes information indicating block switching levels and information indicating block switching results. Herein, the information related to block switching is included in the syntax, which is used in the decoding process, described in detail below.

For example, settings are made so that a minimum block size generated after the block switching process is $N_B$=N/32. However, this setting is only an example for simplifying the description of the present invention. Therefore, settings according to the present invention are not limited to this setting.

More specifically, when the minimum block size is $N_B$=N/32, this indicates that the block switching process has been hierarchically performed 5 times, which is referred to as a level 5 block switching. Alternatively, when the minimum block size is $N_B$=N/16, this indicates that the block switching process has been hierarchically performed 4 times, which is referred to as a level 4 block switching. Similarly, when the minimum block size is $N_B$=N/8, the block switching process has been hierarchically performed 3 times, which is referred to as a level 3 block switching. And, when the minimum block size is $N_B$=N/4, the block switching process has been hierarchically performed 2 times, which is referred to as a level 2 block switching. When the minimum block size is $N_B$=N/2, the block switching process has been hierarchically performed 1 time, which is referred to as a level 1 block switching. Finally, when the minimum block size is $N_B$=N, the hierarchical block switching process has not been performed, which is referred to as a level 0 block switching.

In embodiments of the present invention, the information indicating the block switching level will be referred to as a first block switching information. For example, the first block switching information may be represented by a 2-bit "block_switching" field within the syntax shown in Table 6, which will be described in a later process. More specifically, "block_switching=00" signifies level 0, "block_switching=01" signifies any one of level 1 to level 3, "block_switching=10" signifies level 4, and "block_switching=11" signifies level 5.

Additionally, information indicating the results of the block switching performed for each hierarchical level in accordance with the above-described block switching levels is referred to in the embodiments as second block switching information. Herein, the second block switching information may be represented by a "bs_info" field which is expressed by any one of 8 bits, 16 bits, and 32 bits within the syntax shown in Table 7. More specifically, if "block_switching=01" (signifying any one of level 1 to level 3), "bs_info" is expressed as 8 bits. If "block_switching=10" (signifying level 4), "bs_info" is expressed as 16 bits. In other words, up to 4 levels of block switching results may be indicated by using 16 bits. Furthermore, if "block_switching=11" (signifying level 5, "bs_info" is expressed as 32 bits. In other words, up to 5 levels of block switching results may be indicated by using 32 bits. Finally, if "block_switching=00" (signifying that the block switching has not been performed), "bs_info" is not transmitted. This signifies that one channel configures one block.

The total number of bits being allocated for the second block switching information is decided based upon the level value of the first block switching information. This may result in reducing the final bit rate. The relation between the first block switching information and the second block switching information is briefly described in Table 1 below.

TABLE 1

Block switching levels.

| Maximum #levels | Minimum $N_B$ | #Bytes for "bs_info" |
|---|---|---|
| 0 ("block_switching = 00") | N | 0 |
| 1 ("block_switching = 01") | N/2 | 1 (=8bits) |
| 2 ("block_switching = 01") | N/4 | 1 (=8bits) |
| 3 ("block_switching = 01") | N/8 | 1 (=8bits) |
| 4 ("block_switching = 10") | N/16 | 2 (=16bits) |
| 5 ("block_switching = 11") | N/32 | 4 (=32bits) |

Hereinafter, an embodiment of a method of configuring (or mapping) each bit within the second block switching information (bs_info) will now be described in detail.

The bs_info field may include up to 4 bytes in accordance with the above-described embodiments. The mapping of bits with respect to levels 1 to 5 may be [(0)1223333 44444444 55555555 55555555]. The first bit may be reserved for indicating independent or synchronous block switching, which is described in more detail below in the Independent/Synchronous Block Switching section. FIGS. 5(a)-5(f) illustrate different block switching examples for a channel where level 3 block switching may take place. Therefore, in these examples, the minimum block length is $N_B$=N/8, and the bs_info consists of one byte. Starting from the maximum block length $N_B$=N, the bits of bs_info are set if a block is further subdivided. For example, in FIG. 5(a), there is no subdivision at all, thus "bs_info" is (0)000 0000. In FIG. 5(b), the frame is subdivided ((0)1 . . . ) and the second block of length N/2 is further split ((0)101 . . . ) into two blocks of length N/4; thus "bs_info" is (0)1010 0000. In FIG. 5(c), the frame is subdivided ((0)1 . . . ), and only the first block of length N/2 is further split ((0)110 . . . ) into two blocks of length N/4; thus "bs_info" is (0)1100 0000. In FIG. 5(d), the frame is subdivided ((0)1 . . . ), the first and second blocks of length N/2 is further split ((0)111 . . . ) into two blocks of length N/4, and only the second block of length N/4 is further split ((0)11101 . . . ) into two blocks of length N/8; thus "bs_info" is (0)111 0100.

As discussed above, the examples in FIGS. 5(e) and 5(f) represent cases of block switching that are not permitted because the N/2 block in FIG. 5(e) and the first N/4 block in FIG. 5(f) could not have been obtained by subdividing a block of the previous level.

Independent/Synchronous Block Switching

Figure 6:
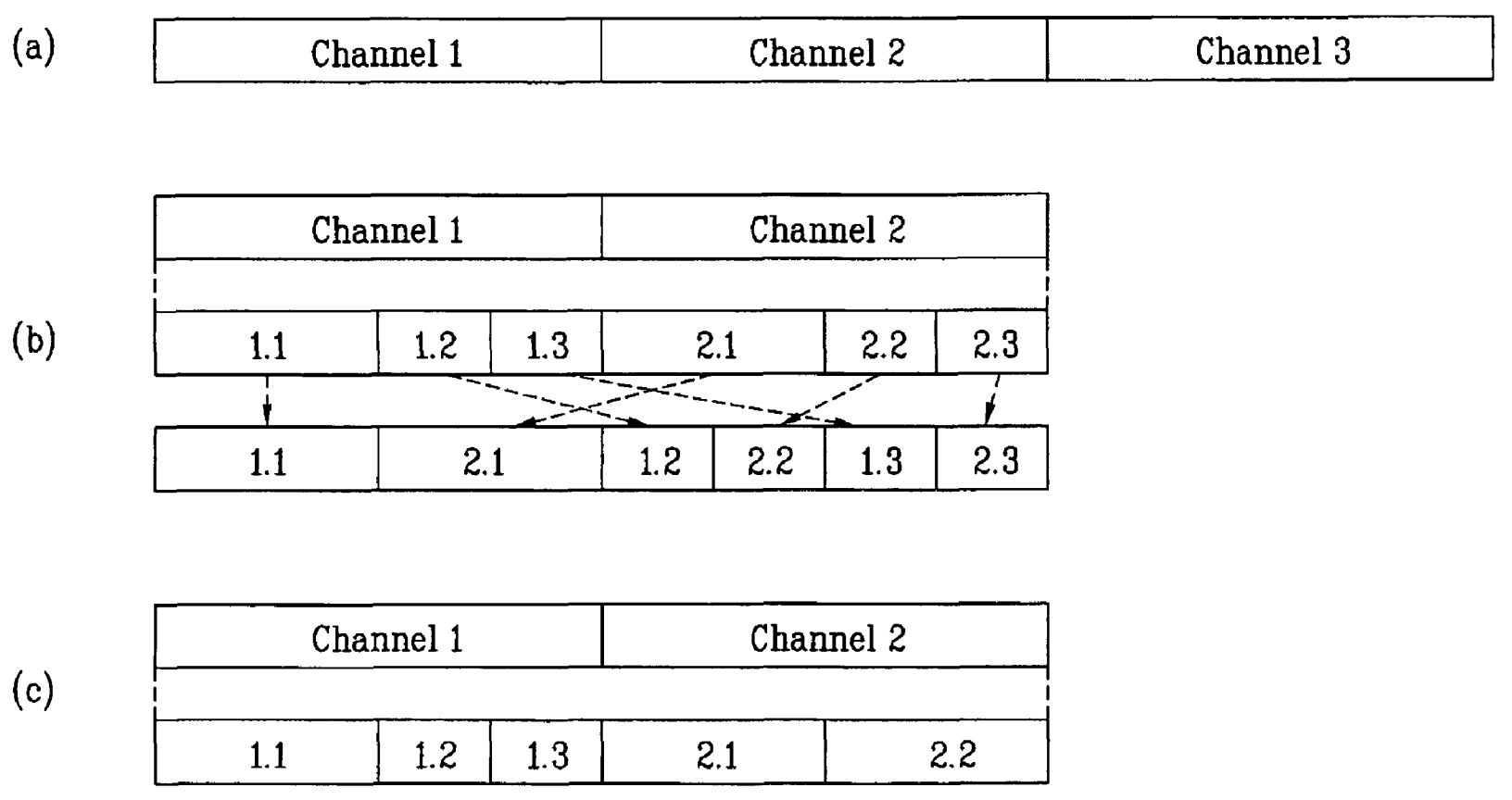

FIGS. 6(a)-6(c) are example illustrations of block switching according to embodiments of the present invention.

More specifically, FIG. 6(a) illustrates an example where block switching has not been performed for channels 1, 2, and 3. FIG. 6(b) illustrates an example in which two channels (channels 1 and 2) configure one channel pair, and block switching is performed synchronously in channels 1 and 2. Interleaving is also applied in this example. FIG. 6(c) illustrates an example in which two channels (channels 1 and 2) configure one channel pair, and the block switching of channels 1 and 2 is performed independently. Herein, the channel pair refers to two arbitrary audio channels. The decision on which channels are grouped into channel pairs can be made automatically by the encoder or manually by the user. (e.g., L and R channels, Ls and Rs channels).

In independent block switching, while the length of each channel may be identical for all channels, the block switching can be performed individually for each channel. Namely, as shown in FIG. 6(c), the channels may be divided into blocks differently. If the two channels of a channel pair are correlated with each other and difference coding is used, both channels of a channel pair may be block switched synchronously. In synchronous block switching, the channels are block switched (i.e., divided into blocks) in the same manner. FIG. 6(b) illustrates an example of this, and further illustrates that the blocks may be interleaved. If the two channels of a channel pair are not correlated with each other, difference coding may not provide a benefit, and thus there will be no need to block switch the channels synchronously. Instead, it may be more appropriate to switch the channels independently.

Furthermore, according to another embodiment of the present invention, the described method of independent or synchronous block switching may be applied to a multi-channel group having a number of channels equal to or more than 3 channels. For example, if all channels of a multi-channel group are correlated with each other, all channels of a multi-channel group may be switched synchronously. On the other hand, if all channels of a multi-channel group are not correlated with each other, each channel of the multi-channel group may be switched independently.

Moreover, the "bs_info" field is used as the information for indicating the block switching result. Additionally, the "bs_info" field is also used as the information for indicating whether block switching has been performed independently or performed synchronously for each channel configuring the channel pair. In this case, as described above, a particular bit (e.g., first bit) within the "bs_info" field may be used. If, for example, the two channels of the channel pair are independent from one another, the first bit of the "bs_info" field is set to "1". On the other hand, if the two channels of the channel pair are synchronous to one another, the first bit of the "bs_info" field is set as "0".

Hereinafter, FIGS. 6(a), 6(b), and 6(c) will now be described in detail.

Referring to FIG. 6(a), since none of the channels perform block switching, the related "bs_info" is not generated.

Referring to FIG. 6(b), channels 1 and 2 configure a channel pair, wherein the two channels are synchronous to one another, and wherein block switching is performed synchronously. For example, in FIG. 6(b), both channels 1 and 2 are split into blocks of length N/4, both having the same bs_info "bs_info=(0)101 0000". Therefore, one "bs_info" may be transmitted for each channel pair, which results in reducing the bit rate. Furthermore, if the channel pair is synchronous, each block within the channel pair may be required to be interleaved with one another. The interleaving may be beneficial (or advantageous). For example, a block of one channel (e.g., block 1.2 in FIG. 6(b)) within a channel pair may depend on previous blocks from both channels (e.g., blocks 1.1 and 2.1 in FIG. 6(b)), and so these previous blocks should be available prior to the current one.

Referring to FIG. 6(c), channels 1 and 2 configure a channel pair. However, in this example, block switching is performed independently. More specifically, channel 1 is split into blocks of a size (or length) of up to N/4 and has a bs_info of "bs_info=(1)101 0000". Channel 2 is split into blocks of a size of up to N/2 and has a bs_info of "bs_info=(1)100 0000". In the example shown in FIG. 6(c), block switching is performed independently among each channel, and therefore, the interleaving process between the blocks is not performed. In other words, for the channel having the blocks switched independently, channel data may be arranged separately.

Joint Channel Coding

Joint channel coding, also called joint stereo, can be used to exploit dependencies between two channels of a stereo signal, or between any two channels of a multi-channel signal. While it is straightforward to process two channels $x_1(n)$ and $x_2(n)$ independently, a simple method of exploiting dependencies between the channels is to encode the difference signal:

$$d(n)=x_2(n)-x_1(n)$$

instead of x1(n) or x2(n). Switching between $x_1(n)$, $x_2(n)$ and d(n) in each block may be carried out by comparison of the individual signals, depending on which two signals can be coded most efficiently. Such prediction with switched difference coding is advantageous in cases where two channels are very similar to one another. In case of multi-channel material, the channels can be rearranged by the encoder in order to assign suitable channel pairs.

Besides simple difference coding, lossless audio codec also supports a more complex scheme for exploiting inter-channel redundancy between arbitrary channels of multi-channel signals.

Random Access

The present invention relates to audio lossless coding and is able to supports random access. Random access stands for fast access to any part of the encoded audio signal without costly decoding of previous parts. It is an important feature for applications that employ seeking, editing, or streaming of the compressed data. In order to enable random access, within a random access unit, the encoder needs to insert a frame that can be decoded without decoding previous frames. The inserted frame is referred to as a "random access frame". In such a random access frame, no samples from previous frames may be used for prediction.

Hereinafter, the information for random access according to the present invention will be described in detail. Referring to the configuration syntax (shown in Table 6), information related with random access are transmitted as configuration information. For example, a "random_access" field is used as information for indicating whether random access is allowed, which may be represented by using 8 bits. Furthermore, if random access is allowed, the 8-bit "random_access" field designates the number of frames configuring a random access unit. For example, when "random_access=0000 0000", the random access is not supported. In other words, when "random_access>0", random access is supported. More specifically, when "random_access=0000 0001", this indicates that the number of frames configuring the random access unit is 1. This signifies that random access is allowed in all frame units. Furthermore, when "random_access=1111 1111", this indicates that the number of frames configuring the random access unit is 255. Accordingly, the "random_access" information corresponds to a distance between a random access frame within the current random access unit and a random access frame within the next random access unit. Herein, the distance is expressed by the number of frames.

A 32-bit "ra_unit_size" field is included in the bitstream and transmitted. Herein, the "ra_unit_size" field indicates the size from the current random access frame to the next random access frame in byte units. Accordingly, the "ra_unit_size" field is either included in the configuration syntax (Table 6) or included in the frame-data syntax (Table 7). The configuration syntax (Table 6) may further include information indicating a location where the "ra_unit_size" information is stored within the bitstream. This information is represented as a 2-bit "ra_flag" field. More specifically, for example, when "ra_flag=00", this indicates that the "ra_unit_size" information is not stored in the bitstream. When the "ra_flag=01", this indicated that the "ra_unit_size" information is stored in the frame-data syntax (Table 7) within the bitstream. Furthermore, when the "ra_flag=10", the "ra_unit_size" information is stored in the configuration syntax (Table 6) within the bitstream. If the "ra_unit_size" information is included in the configuration syntax, this indicates that the "ra_unit_size" information is transmitted on the bitstream only one time and is applied equally to all random access units. Alternatively, if the "ra_unit_size" information is included in the frame-data syntax, this indicates the distance between the random access frame within the current random access unit and the random access frame within the next random access unit. Therefore, the "ra_unit_size" information is transmitted for each random access unit within the bitstream.

Accordingly, the "random_access" field within the configuration syntax (Table 6) may also be referred to as first general information. And, the "ra_flag" field may also be referred to as second general information. In this aspect of the present invention, an audio signal includes configuration information and a plurality of random access units, each random access unit containing one or more audio data frames, one of which is a random access frame, wherein the configuration information includes first general information indicating a distance between two adjacent random access frames in frames, and second general information indicating where random access unit size information for each random access unit is stored. The random access unit size information indicating a distance between two adjacent random access frames in bytes.

Alternatively, in this aspect of the present invention, a method of decoding an audio signal includes receiving the audio signal having configuration information and a plurality of random access units, each random access unit containing one or more audio data frames, one of which is a random access frame, reading first general information from the configuration information, the first general information indicating a distance between two adjacent random access frames in frames, and reading second general information from the configuration information, the second general information indicating where random access size information for each random access unit is stored, and the random access unit size information indicating a distance between two adjacent random access frames in bytes.

Channel Configuration

As shown in FIG. 3, an audio signal includes multi-channels information according to the present invention. For example, each channel may be mapped at a one-to-one correspondence with a location of an audio speaker. The configuration syntax (Table 6 below) includes channel configuration information, which is indicated as a 16-bit "chan_config_info" field and a 16-bit "channels" field. The "chan_config_info" field includes information for mapping the channels to the loudspeaker locations and the 16-bit "channels" field includes information indicating the total number of channels. For example, when the "channels" field is equal to "0", this indicates that the channel corresponds to a mono channel. When the "channels" field is equal to "1", this indicates that the channel corresponds to one of stereo channels. And, when the "channels" field is equal to or more than "2", this indicates that the channel corresponds to one of multi-channels.

Table 2 below shows examples of each bit configuring the "chan_config_info" field and each respective channel corresponding thereto. More specifically, when a corresponding channel exists within the transmitted bitstream, the corresponding bit within the "chan_config_info" field is set to "1". Alternatively, when a corresponding channel does not exist within the transmitted bitstream, the corresponding bit within the "chan_config_info" field is set to "0". The present invention also includes information indicating whether the "chan_config_info" field exists within the configuration syntax (Table 6). This information is represented as a 1-bit "chan_config" flag. More specifically, "chan_config=0" indicates that the "chan_config_info" field does not exist. And, "chan_config=1" indicates that the "chan_config_info" field exists. Therefore, when "chan_config=0", this indicates that the "chan_config_info" field is not newly defined within the configuration syntax (Table 6).

TABLE 2

Channel configuration.

| Speaker location | Abbreviation | Bit position in chan_config_info |
|---|---|---|
| Left | L | 1 |
| Right | R | 2 |
| Left Rear | Lr | 3 |
| Right Rear | Rr | 4 |
| Left Side | Ls | 5 |
| Right Side | Rs | 6 |
| Center | C | 7 |
| Center Rear/ Surround | S | 8 |
| Low Frequency Effects | LFE | 9 |
| Left Downmix | L0 | 10 |
| Right Downmix | R0 | 11 |
| Mono Downmix | M | 12 |
| (reserved) | | 13-16 |

Frame Length

As shown in FIG. 3, an audio signal includes multiple or multi-channels according to the present invention. Therefore, when performing encoding, information on the number of multi-channels configuring one frame and information on the number of samples for each channel are inserted in the bitstream and transmitted. Referring to the configuration syntax (Table 6), a 32-bit "samples" field is used as information indicating the total number of audio data samples configuring each channel. Further, a 16-bit "frame_length" field is used as information indicating the number of samples for each channel within the corresponding frame.

Furthermore, a 16-bit value of the "frame_length" field is determined by a value used by the encoder, and is referred to as a user-defined value. In other words, instead of being a fixed value, the user-defined value is arbitrarily determined upon the encoding process.

Therefore, during the decoding process, when the bitstream is received through the demultiplexing part 200 of shown in FIG. 2, the frame number of each channel should first be obtained. This value is obtained according to the algorithm shown below.

```
frames = samples / frame_length;
rest = samples % frame_length;
if (rest)
{
   frames++;
   frlen_last = rest;
}
else
   frlen_last = frame_length;
```

More specifically, the total number of frames for each channel is calculated by dividing the total number of samples for each channel, which is decided by the "samples" field transmitted through the bitstream, by the number of samples within a frame of each channel, which is decided by the "frame_length" field. For example, when the total number of samples decided by the "samples" field is an exact multiple of the number of samples within each frame, which is decided by the "frame_length" field, the multiple value becomes the total number of frames. However, if the total number of samples decided by the "samples" field is not an exact multiple of the number of samples decided by the "frame_length" field, and a remainder (or rest) exist, the total number of frames increases by "1" more than the multiple value. Furthermore, the number of samples of the last frame (frlen_last) is decided as the remainder (or rest). This indicates that only the number of samples of the last frame is different from its previous frame.

By defining a standardized rule between the encoder and the decoder, as described above, the encoder may freely decide and transmit the total number of samples ("samples" field) for each channel and the number of samples ("frame_length" field) within a frame of each channel. Furthermore, the decoder may accurately decide, by using the above-described algorithm on the transmitted information, the number of frames for each channel that is to be used for decoding.

Linear Prediction

In the present invention, linear prediction is applied for the lossless audio coding. The predictor 160 shown in FIG. 1 includes at least one or more filter coefficients so as to predict a current sample value from a previous sample value. Then, the second entropy coding part 180 performs entropy coding on a residual value corresponding to the difference between the predicted value and the original value. Additionally, the predictor coefficient values for each block that are applied to the predictor 160 are selected as optimum values from the coefficient estimating part 120. Further, the predictor coefficient values are entropy coded by the first entropy coding part 140. The data coded by the first entropy coding part and the second entropy coding part 180 are inserted as part of the bitstream by the multiplexing part 190 and then transmitted.

Hereinafter, the method of performing linear prediction according to the present invention will now be described in detail.

Prediction with FIR Filters

Linear prediction is used in many applications for speech and audio signal processing. Hereinafter, an exemplary operation of the predictor 160 will be described based on Finite Impulse Response (FIR) filters. However, it is apparent that this example will not limit the scope of the present invention.

The current sample of a time-discrete signal x(n) can be approximately predicted from previous samples x(n−k). The prediction is given by the following equation.

$$\hat{x}(n) = \sum_{k=1}^{K} h_k * x(n-k),$$

wherein K is the order of the predictor. If the predicted samples are close to the original samples, the residual shown below:

$$e(n) = x(n) - \hat{x}(n)$$

has a smaller variance than x(n) itself, hence e(n) can be encoded more efficiently.

The procedure of estimating the predictor coefficients from a segment of input samples, prior to filtering that segment is referred to as forward adaptation. In this case, the coefficients should be transmitted. On the other hand, if the coefficients are estimated from previously processed segments or samples, e.g., from the residual, reference is made to backward adaptation. The backward adaptation procedure has the advantage that no transmission of the coefficients is needed, since the data required to estimate the coefficients is available to the decoder as well.

Forward-adaptive prediction methods with orders around 10 are widely used in speech coding, and can be employed for lossless audio coding as well. The maximum order of most forward-adaptive lossless prediction schemes is still rather small, e.g., K=32. An exception is the special 1-bit lossless codec for the Super Audio CD, which uses prediction orders of up to 128.

On the other hand, backward-adaptive FIR filters with some hundred coefficients are commonly used in many areas, e.g., channel equalization and echo cancellation. Most of these systems are based on the LMS algorithm or a variation thereof, which has also been proposed for lossless audio coding. Such LMS-based coding schemes with high orders are applicable since the predictor coefficients do not have to be transmitted as side information, thus their number does not contribute to the data rate. However, backward-adaptive codecs have the drawback that the adaptation has to be carried out both in the encoder and the decoder, making the decoder significantly more complex than in the forward-adaptive case.

Forward-Adaptive Prediction

As an exemplary embodiment of the present invention, forward adaptive prediction will be given as an example in the description set forth herein. In forward-adaptive linear prediction, the optimal predictor coefficients $h_k$ (in terms of a minimized variance of the residual) are usually estimated for each block by the coefficient estimating part 120 using the autocorrelation method or the covariance method. The autocorrelation method, using the conventional Levinson-Durbin algorithm, has the additional advantage of providing a simple means to iteratively adapt the order of the predictor. Furthermore, the algorithm inherently calculates the corresponding parcor coefficients as well.

Another aspect of forward-adaptive prediction is to determine a suitable prediction order. Increasing the order decreases the variance of the prediction error, which leads to a smaller bit rate $R_e$ for the residual. On the other hand, the bit rate $R_c$ for the predictor coefficients will rise with the number of coefficients to be transmitted. Thus, the task is to find the optimum order which minimizes the total bit rate. This can be expressed by minimizing the equation below:

$$R_{total}(K) = R_e(K) + R_c(K),$$

with respect to the prediction order K. As the prediction gain rises monotonically with higher orders, Re decreases with K. On the other hand $R_c$ rises monotonically with K, since an increasing number of coefficients should be transmitted.

The search for the optimum order can be carried out efficiently by the coefficient estimating part 120, which determines recursively all predictors with increasing order. For each order, a complete set of predictor coefficients is calculated. Moreover, the variance $\sigma_e^2$ of the corresponding residual can be derived, resulting in an estimate of the expected bit rate for the residual. Together with the bit rate for the coefficients, the total bit rate can be determined in each iteration, i.e., for each prediction order. The optimum order is found at the point where the total bit rate no longer decreases.

While it is obvious from the above equation that the coefficient bit rate has a direct effect on the total bit rate, a slower increase of $R_c$ also allows to shift the minimum of $R_{total}$ to higher orders (wherein $R_e$ is smaller as well), which would lead to better compression. Hence, efficient yet accurate quantization of the predictor coefficients plays an important role in achieving maximum compression.

Prediction Orders

In the present invention, the prediction order K, which decides the number of predictor coefficients for linear prediction, is determined. The prediction order K is also determined by the coefficient estimating part 120. Herein, information on the determined prediction order is included in the bitstream and then transmitted.

The configuration syntax (Table 6) includes information related to the prediction order K. For example, a 1-bit to 10-bit "max_order" field corresponds to information indicating a maximum order value. The highest value of the 1-bit to 10-bit "max_order" field is K=1023 (e.g., 10-bit). As another information related to the prediction order K, the configuration syntax (Table 6) includes a 1-bit "adapt_order" field, which indicates whether an optimum order for each block exists. For example, when "adapt_order=1", an optimum order should be provided for each block. In a block_data syntax (Table 8), the optimum order is provided as a 1-bit to 10-bit "opt_order" field. Further, when "adapt_order=0", a separate optimum order is not provided for each block. In this case, the "max_order" field becomes the final order applied to all of the blocks.

The optimum order (opt_order) is decided based upon the value of max_order field and the size ($N_B$) of the corresponding block. More specifically, for example, when the max_order is decided as $K_{max}$=10 and "adapt_order=1", the opt_order for each block may be decided considering the size of the corresponding block. In some case, the opt_order value being larger than max_order ($K_{max}$=10) is possible.

In particular, the present invention relates to higher prediction orders. In the absence of hierarchical block switching, there may be a factor of 4 between the long and the short block length (e.g. 4096 & 1024 or 8192 & 2048), in accordance with the embodiments. On the other hand, in the embodiments where hierarchical block switching is implemented, this factor can be increased (e.g., up to 32), enabling a larger range (e.g., 16384 down to 512 or even 32768 to 1024 for high sampling rates).

In the embodiments where hierarchical block switching is implemented, in order to make better use of very long blocks, higher maximum prediction orders may be employed. The maximum order may be $K_{max}$=1023. In the embodiments, $K_{max}$ may be bound by the block length $N_B$, for example, $K_{max} < N_B/8$ (e.g., $K_{max}$=255 for $N_B$=2048). Therefore, using $K_{max}$=1023 may require a block length of at least $N_B$=8192. In the embodiments, the "max_order" field in the configuration syntax (Table 6) can be up to 10 bits and "opt_order" field in the block_data syntax (Table 8) can also be up to 10 bits. The actual number of bits in a particular block may depend on the maximum order allowed for a block. If the block is short, a local prediction order may be smaller than a global prediction order. Herein, the local prediction order is determined from considering the corresponding block length $N_B$, and the global prediction order is determined from the "max_order" $K_{max}$ in the configuration syntax. For example, if $K_{max}$=1023, but $N_B$=2048, the "opt_order" field is determined on 8 bits (instead of 10) due to a local prediction order of 255.

More specifically, the opt_order may be determined based on the following equation:

opt_order=min(global prediction order,local prediction order);

And. the global and local prediction orders may be determined by:

global prediction order=ceil(log 2(maximum prediction order+1))

local prediction order=max(ceil(log 2((Nb>>3)−1)),1)

In the embodiments, data samples of the subdivided block from a channel are predicted. A first sample of a current block is predicted using the last K samples of a previous block. The K value is determined from the opt_order which is derived from the above-described equation.

If the current block is a first block of the channel, no samples from the previous block are used. In this case, prediction with progressive order is employed. For example, assuming that the opt_order value is K=5 for a corresponding block, the first sample in the block does not perform prediction. The second sample of the block uses the first sample of the block to perform the prediction (as like K=1), the third sample of the block uses the first and second samples of the block to perform the prediction (as like K=2), etc. Therefore, starting from the sixth sample and for samples thereafter, prediction is performed according to the opt_order of K=5. As described above, the prediction order increases progressively from K=1 to K=5.

The above-described progressive order type of prediction is very advantageous when used in the random access frame. Since the random access frame corresponds to a reference frame of the random access unit, the random access frame does not perform prediction by using the previous frame sample. Namely, this progressive prediction technique may be applied at the beginning of the random access frame.

Quantization of Predictor Coefficients

The above-described predictor coefficients are quantized in the quantizing part 130 of FIG. 1. Direct quantization of the predictor coefficients $h_k$ is not very efficient for transmission, since even small quantization errors may result in large deviations from the desired spectral characteristics of the optimum prediction filter. For this reason, the quantization of predictor coefficients is based on the parcor (reflection) coefficients $r_k$, which can be calculated by the coefficient estimating part 120. As described above, for example, the coefficient estimating part 120 is processed using the conventional Levinson-Durbin algorithm.

The first two parcor coefficients ($\gamma_1$ and $\gamma_2$ correspondingly) are quantized by using the following functions:

$a_1 = \lfloor 64(-1+\sqrt{2}\sqrt{\gamma_1+1}) \rfloor$;

$a_2 = \lfloor 64(-1+\sqrt{2}\sqrt{-\gamma_2+1}) \rfloor$;

while the remaining coefficients are quantized using simple 7-bit uniform quantizers:

$a_k = \lfloor 64\gamma_k \rfloor$; $(k>2)$.

In all cases the resulting quantized values $a_k$ are restricted to the range [−64,63].

Entropy Coding

As shown in FIG. 1, two types of entropy coding are applied in the present invention. More specifically, the first entropy coding part 140 is used for coding the above-described predictor coefficients. And, the second entropy coding part 180 is used for coding the above-described audio original samples and audio residual samples. Hereinafter, the two types of entropy coding will now be described in detail.

First Entropy Coding of the Predictor Coefficient

The related art Rice code is used as the first entropy coding method according to the present invention. For example, transmission of the quantized coefficients $a_k$ is performed by producing residual values:

$\delta_k = a_k - \text{offset}_k$, which, in turn, are encoded by using the first entropy coding part 140, e.g., the Rice code method. The corresponding offsets and parameters of Rice code used in this process can be globally chosen from one of the sets shown in Table 3, 4 and 5 below. A table index (i.e., a 2-bit "coef_table") is indicated in the configuration syntax (Table 6). If "coef_table=11", this indicates that no entropy coding is applied, and the quantized coefficients are transmitted with 7 bits each. In this case, the offset is always −64 in order to obtain unsigned values $\delta_k = a_k + 64$ that are restricted to [0,127]. Conversely, if "coeff_table=00", Table 3 below is selected, and if "coeff_table=01", Table 4 below is selected. Finally, if "coeff_table=11", Table 5 is selected.

When receiving the quantized coefficients in the decoder of FIG. 2, the first entropy decoding part 220 reconstructs the predictor coefficients by using the process that the residual values $\delta_k$ are combined with offsets to produce quantized indices of parcor coefficients $a_k$:

$a_k = \delta_k + \text{offset}_k$.

Thereafter, the reconstruction of the first two coefficients ($\gamma_1$ and $\gamma_2$) is performed by using:

$\text{par}_1 = \lfloor \hat{\gamma}_1 2^Q \rfloor = \Gamma(a_1)$;

$\text{par}_2 = \lfloor \hat{\gamma}_2 2^Q \rfloor = -\Gamma(a_2)$;

wherein $2^Q$ represents a constant (Q=20) scale factor required for integer representation of the reconstructed coefficients, and $\Gamma(.)$ is an empirically determined mapping table (not shown as the mapping table may vary with implementation).

Accordingly, the three types of coefficient tables used for the first entropy coding are provided according to the sampling frequency. For example, the sampling frequency may be divided to 48 kHz, 96 kHz, and 192 kHz. Herein, each of the three Tables 3, 4, and 5 is respectively provided for each sampling frequency.

Instead of using a single table, one of three different tables can be chosen for the entire file. The table should typically be chosen depending on the sampling rate. For material with 44.1 kHz, the applicant of the present invention recommends to use the 48 kHz table. However, in general, the table can also be chosen by other criteria.

TABLE 3

Rice code parameters used for encoding of quantized coefficients (48 kHz).

| Coefficient # | Offset | Rice parameter |
|---|---|---|
| 1 | −52 | 4 |
| 2 | −29 | 5 |
| 3 | −31 | 4 |
| 4 | 19 | 4 |
| 5 | −16 | 4 |
| 6 | 12 | 3 |
| 7 | −7 | 3 |
| 8 | 9 | 3 |
| 9 | −5 | 3 |
| 10 | 6 | 3 |
| 11 | −4 | 3 |
| 12 | 3 | 3 |
| 13 | −3 | 2 |
| 14 | 3 | 2 |
| 15 | −2 | 2 |
| 16 | 3 | 2 |
| 17 | −1 | 2 |
| 18 | 2 | 2 |
| 19 | −1 | 2 |
| 20 | 2 | 2 |

TABLE 3-continued

Rice code parameters used for encoding of
quantized coefficients (48 kHz).

| Coefficient # | Offset | Rice parameter |
|---|---|---|
| 2k − 1, k > 10 | 0 | 2 |
| 2k, k > 10 | 1 | 2 |

TABLE 4

Rice code parameters used for encoding of
quantized coefficients (96 kHz).

| Coefficient # | Offset | Rice parameter |
|---|---|---|
| 1 | −58 | 3 |
| 2 | −42 | 4 |
| 3 | −46 | 4 |
| 4 | 37 | 5 |
| 5 | −36 | 4 |
| 6 | 29 | 4 |
| 7 | −29 | 4 |
| 8 | 25 | 4 |
| 9 | −23 | 4 |
| 10 | 20 | 4 |
| 11 | −17 | 4 |
| 12 | 16 | 4 |
| 13 | −12 | 4 |
| 14 | 12 | 3 |
| 15 | −10 | 4 |
| 16 | 7 | 3 |
| 17 | −4 | 4 |
| 18 | 3 | 3 |
| 19 | −1 | 3 |
| 20 | 1 | 3 |
| 2k − 1, k > 10 | 0 | 2 |
| 2k, k > 10 | 1 | 2 |

TABLE 5

Rice code parameters used for encoding of
quantized coefficients (192 kHz).

| Coefficient # | Offset | Rice parameter |
|---|---|---|
| 1 | −59 | 3 |
| 2 | −45 | 5 |
| 3 | −50 | 4 |
| 4 | 38 | 4 |
| 5 | −39 | 4 |
| 6 | 32 | 4 |
| 7 | −30 | 4 |
| 8 | 25 | 3 |
| 9 | −23 | 3 |
| 10 | 20 | 3 |
| 11 | −20 | 3 |
| 12 | 16 | 3 |
| 13 | −13 | 3 |
| 14 | 10 | 3 |
| 15 | −7 | 3 |
| 16 | 3 | 3 |
| 17 | 0 | 3 |
| 18 | −1 | 3 |
| 19 | 2 | 3 |
| 20 | −1 | 2 |
| 2k − 1, k > 10 | 0 | 2 |
| 2k, k > 10 | 1 | 2 |

Second Entropy Coding of the Residual

The present invention contains two different modes of the coding method applied to the second entropy coding part 180 of FIG. 1, which will now be described in detail.

In the simple mode, the residual values e(n) are entropy coded using Rice code. For each block, either all values can be encoded using the same Rice code, or the block can be further divided into four parts, each encoded with a different Rice code. The indices of the applied codes are transmitted, as shown in FIG. 1. Since there are different ways to determine the optimal Rice code for a given set of data, it is up to the encoder to select suitable codes depending upon the statistics of the residual.

Alternatively, the encoder can use a more complex and efficient coding scheme using BGMC mode. In the BGMC mode, the encoding of residuals is accomplished by splitting the distribution in two categories. The two types include residuals that belong to a central region of the distribution, $|e(n)|<e_{max}$, and residuals that belong to its tails. The residuals in tails are simply re-centered (i.e., for $e(n)>e_{max}$, $e_t(n)=e$ (n)−$e_{max}$ is provided) and encoded using Rice code as described above. However, in order to encode residuals in the center of the distribution, the BGMC first splits the residuals into LSB and MSB components, then the BGMC encodes MSBs using block Gilbert-Moore (arithmetic) codes. And finally, the BGMC transmits LSBs using direct fixed-lengths codes. Both parameters $e_{max}$ and the number of directly transmitted LSBs may be selected such that they only slightly affect the coding efficiency of this scheme, while allowing the coding to be significantly less complex.

The configuration syntax (Table 6) and the block_data syntax (Table 8) according to the present invention include information related to coding of the Rice code and BGMC code. The information will now be described in detail The configuration syntax (Table 6) first includes a 1-bit "bgmc_mode" field. For example, "bgmc_mode=0" signifies the Rice code, and "bgmc_mode=1" signifies the BGMC code. The configuration syntax (Table 6) also includes a 1-bit "sb_part" field. The "sb_part" field corresponds to information related to a method of partitioning a block to a sub-block and coding the partitioned sub-block. Herein, the meaning of the "sb_part" field varies in accordance with the value of the "bgmc_mode" field.

For example, when "bgmc_mode=0", in other words when the Rice code is applied, "sb_part=0" signifies that the block is not partitioned into sub-blocks. Alternatively, "sb_part=1" signifies that the block is partitioned at a 1:4 sub-block partition ratio. Additionally, when "bgmc_mode=1", in other words when the BGMC code is applied, "sb_part=0" signifies that the block is partitioned at a 1:4 sub-block partition ratio. Alternatively, "sb_part=1" signifies that the block is partitioned at a 1:2:4:8 sub-block partition ratio.

The block_data syntax (Table 8) for each block corresponding to the information included in the configuration syntax (Table 6) includes 0-bit to 2-bit variable "ec_sub" fields. More specifically, the "ec_sub" field indicates the number of sub-blocks existing in the actual corresponding block. Herein, the meaning of the "ec_sub" field varies in accordance with the value of the "bgmc_mode"+"sb_part" fields within the configuration syntax (Table 6).

For example, "bgmc_mode+sb_part=0" signifies that the Rice code does not configure the sub-block. Herein, the "ec_sub" field is a 0-bit field, which signifies that no information is included.

In addition, "bgmc_mode+sb_part=1" signifies that the Rice code or the BGMC code is used to partition the block to sub-blocks at a 1:4 rate. Herein, only 1 bit is assigned to the "ec_sub" field. For example, "ec_sub=0" indicates one sub-block (i.e., the block is not partitioned to sub-blocks), and "ec_sub=1" indicates that 4 sub-blocks are configured.

Furthermore, "bgmc_mode+sb_part=2" signifies that the BGMC code is used to partition the block to sub-blocks at a 1:2:4:8 rate. Herein, 2 bits are assigned to the "ec_sub" field.

For example, "ec_sub=00" indicates one sub-block (i.e., the block is not partitioned to sub-blocks), and, "ec_sub=01" indicates 2 sub-blocks. Also, "ec_sub=10" indicates 4 sub-blocks, and "ec_sub=11" indicates 8 sub-blocks.

The sub-blocks defined within each block as described above are coded by second entropy coding part 180 using a difference coding method. An example of using the Rice code will now be described. For each block of residual values, either all values can be encoded using the same Rice code, or, if the "sb_part" field in the configuration syntax is set, the block can be partitioned into 4 sub-blocks, each encoded sub-block having a different Rice code. In the latter case, the "ec_sub" field in the block-data syntax (Table 8) indicates whether one or four blocks are used.

While the parameter s[i=0] of the first sub-block is directly transmitted with either 4 bits (resolution≦16 bits) or 5 bits (resolution>16 bits), only the differences (s[i]–s[i−1]) of following parameters s[i>0] are transmitted. These differences are additionally encoded using appropriately chosen Rice codes again. In this case, the Rice code parameter used for differences has the value of "0".

Syntax

According to the embodiment of the present invention, the syntax of the various information included in the audio bitstream are shown in the tables below. Table 6 shows a configuration syntax for audio lossless coding. The configuration syntax may form a header periodically placed in the bitstream, may form a header of each frame; etc. Table 7 shows a frame-data syntax, and Table 8 shows a block-data syntax.

TABLE 6

Configuration syntax.

| Syntax | Bits |
|---|---|
| ALSSpecificConfig( ) | |
| { | |
|   samp_freq; | 32 |
|   samples; | 32 |
|   channels; | 16 |
|   file_type; | 3 |
|   resolution; | 3 |
|   floating; | 1 |
|   msb_first; | 1 |
|   frame_length; | 16 |
|   random_access; | 8 |
|   ra_flag; | 2 |
|   adapt_order; | 1 |
|   coef_table; | 2 |
|   long_term_prediction; | 1 |
|   max_order; | 10 |
|   block_switching; | 2 |
|   bgmc_mode; | 1 |
|   sb_part; | 1 |
|   joint_stereo; | 1 |
|   mc_coding; | 1 |
|   chan_config; | 1 |
|   chan_sort; | 1 |
|   crc_enabled; | 1 |
|   RLSLMS | 1 |
|   (reserved) | 6 |
|   if (chan_config) { | |
|     chan_config_info; | 16 |
|   } | |
|   if (chan_sort) { | |
|     for (c = 0; c < channels; c++) | |
|       chan_pos[c]; | 8 |
|   } | |
|   header_size; | 16 |
|   trailer_size; | 16 |
|   orig_header[ ]; | header_size * 8 |
|   orig_trailer[ ]; | trailer_size * 8 |
|   if (crc_enabled) { | |
|     crc; | 32 |
|   } | |
|   if ((ra_flag == 2) && (random_access > 0)) { | |
|     for (f = 0; f < (samples − 1 / frame_length) + 1; f++) | |
|     { | |
|       ra_unit_size | 32 |
|     } | |
|   } | |
| } | |

TABLE 7

Frame_data syntax.

| Syntax | Bits |
|---|---|
| frame_data( ) | |
| { | |
|   if ((ra_flag == 1) && (frame_id % random_access == 0)) | |
|   { | |
|     ra_unit_size | 32 |
|   } | |
|   if (mc_coding && joint_stereo) { | |
|     js_switch; | 1 |
|     byte_align; | |
|   } | |
|   if (!mc_coding || js_switch) { | |
|     for (c = 0; c < channels; c++) { | |
|       if (block_switching) { | |
|         bs_info; | 8, 16, 32 |
|       } | |
|       if (independent_bs) { | |
|         for (b = 0; b < blocks; b++) { | |
|           block_data(c); | |
|         } | |
|       } | |
|       else{ | |
|         for (b = 0; b < blocks; b++) { | |
|           block_data(c); | |
|           block_data(c+1); | |
|         } | |
|         c++; | |
|       } | |
|     } | |
|   } | |
|   else{ | |
|     if (block_switching) { | |
|       bs_info; | 8, 16, 32 |
|     } | |
|     for (b = 0; b < blocks; b++) { | |
|       for (c = 0; c < channels; c++) { | |
|         block_data(c); | |
|         channel_data(c); | |
|       } | |
|     } | |
|   } | |
|   if (floating) | |
|   { | |
|     num_bytes_diff_float; | 32 |
|     diff_float_data( ); | |
|   } | |
| } | |

TABLE 8

Block_data syntax.

| Syntax | Bits |
|---|---|
| block_data( ) | |
| { | |
|   block_type; | 1 |
|   if (block_type == 0) { | |
|     const_block; | 1 |
|     js_block; | 1 |
|     (reserved) | 5 |
|     if (const_block == 1) { | |
|     { | |
|       if (resolution == 8) { | |
|         const_val; | 8 |
|       } | |
|       else if (resolution == 16) { | |
|         const_val; | 16 |
|       } | |
|       else if (resolution == 24) { | |
|         const_val; | 24 |
|       } | |
|       else { | |
|         const_val; | 32 |
|       } | |
|     } | |
|   } | |
|   else { | |
|     js_block; | 1 |
|     if ((bgmc_mode == 0) && (sb_part == 0) { | |
|       sub_blocks = 1; | |
|     } | |
|     else if ((bgmc_mode == 1) && (sb_part ==1) { | |
|       ec_sub; | 2 |
|       sub_blocks = 1 << ec_sub; | |
|     } | |
|     else { | |
|       ec_sub; | 1 |
|       sub_blocks = (ec_sub == 1) ? 4 : 1; | |
|     } | |
|     if (bgmc_mode == 0) { | |
|       for (k = 0; k < sub_blocks; k++) { | |
|         s[k]; | varies |
|       } | |
|     } | |
|     else { | |
|       for (k = 0; k < sub_blocks; k++) { | |
|         s[k],sx[k]; | varies |
|       } | |
|     } | |
|     sb_length = block_length / sub_blocks; | |
|     shift_lsbs; | 1 |
|     if (shift_lsbs == 1) { | |
|       shift_pos; | 4 |
|     } | |
|     if (!RLSLMS) { | |
|       if (adapt_order == 1) { | |
|         opt_order; | 1 … 10 |
|       } | |
|       for (p = 0; p < opt_order; p++) { | |
|         quant_cof[p]; | varies |
|       } | |
|     } | |

Compression Results

In the following, the lossless audio codec is compared with two of the most popular programs for lossless audio compression: the open-source codec FLAC and the Monkey's Audio (MAC 3.97). Herein, the open-source codec FLAC uses forward-adaptive prediction, and the Monkey's Audio (MAC 3.97) is a backward-adaptive codec used as the current state-of-the-art algorithm in terms of compression. Both codecs were run with options providing maximum compression (i.e., flac –8 and mac-c4000). The results for the encoder are determined for a medium compression level (with the prediction order restricted to K_60) and a maximum compression level (K_1023), both with random access of 500 ms. The tests were conducted on a 1.7 GHz Pentium-M system, with 1024 MB of memory. The test comprises nearly 1 GB of stereo waveform data with sampling rates of 48, 96, and 192 kHz, and resolutions of 16 and 24 bits.

Compression Ratio

In the following, the compression ratio is defined as:

$$C = \frac{CompressedFileSize}{OriginalFileSize} * 100\%,$$

wherein smaller values indicate better compression. The results for the examined audio formats are shown in Table 9 (192 kHz material is not supported by the FLAC codec).

TABLE 9

Comparison of average compression ratios for different audio formats (kHz/bits).

| Format | FLAC | MAC | ALS medium | ALS maximum |
|---|---|---|---|---|
| 48/16 | 48.6 | 45.3 | 45.5 | 44.7 |
| 48/24 | 68.4 | 63.2 | 63.3 | 62.7 |
| 96/24 | 56.7 | 48.1 | 46.5 | 46.2 |
| 192/24 | — | 39.1 | 37.7 | 37.6 |
| Total | — | 48.9 | 48.3 | 47.8 |

The results show that ALS at maximum level outperforms both FLAC and Monkey's Audio for all formats, but particularly for high-definition material (i.e., 96 kHz/24-bit and above). Even at medium level, ALS delivers the best overall compression.

Complexity

The complexity of different codecs strongly depends on the actual implementation, particularly that of the encoder. As mentioned above, the audio signal encoder of the present invention is an ongoing development. Thus, we restrict our analysis to the decoder, a simple C code implementation with no further optimizations. The compressed data were generated by the currently best encoder implementation. The average CPU load for real-time decoding of various audio formats, encoded at different complexity levels, is shown in Table 10. Even for maximum complexity, the CPU load of the decoder is only around 20-25%, which in return means that file based decoding is at least 4 to 5 times faster than real-time.

TABLE 10

Average CPU load (percentage on a 1.7 GHz Pentium-M), depending on audio format (kHz/bits) and ALS encoder complexity.

| Format | ALS low | ALS medium | ALS maximum |
|---|---|---|---|
| 48/16 | 1.6 | 4.9 | 18.7 |
| 48/24 | 1.8 | 5.8 | 19.6 |
| 96/24 | 3.6 | 12.0 | 23.8 |
| 192/24 | 6.7 | 22.8 | 26.7 |

The codec is designed to offer a large range of complexity levels. While the maximum level achieves the highest compression at the expense of slowest encoding and decoding speed, the faster medium level only slightly degrades compression, but decoding is significantly less complex than for the maximum level (i.e., approximately 5% CPU load for 48 kHz material). Using a low-complexity level (i.e., K_15, Rice coding) degrades compression by only 1 to 1.5% compared to the medium level, but the decoder complexity is further reduced by a factor of three (i.e., less than 2% CPU load for 48 kHz material). Thus, audio data can be decoded even on hardware with very low computing power.

While the encoder complexity may be increased by both higher maximum orders and a more elaborate block switching algorithm (in accordance with the embodiments), the decoder may be affected by a higher average prediction order.

The foregoing embodiments (e.g., hierarchical block switching) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

INDUSTRIAL APPLICABILITY

It will be apparent to those skilled in the art that various modifications and variations can be made in the present invention without departing from the spirit or scope of the inventions. For example, aspects and embodiments of the present invention can be readily adopted in another audio signal codec like the lossy audio signal codec. Thus, it is intended that the present invention covers the modifications and variations of this invention.

I claim:

1. An audio player, comprising:
a demultiplexing part configured to receive an audio signal having at least first and second channel data, the first and second channel data including a plurality of blocks, the audio signal being transmitted on a digital audio signal;
a predictor configured to obtain first subdivision information indicating a number of levels in a subdivision hierarchy,
the predictor configured to obtain block information indicating a subdivision of the first and second channel data into the plurality of blocks, the block information corresponding to the first and second channel data commonly when the first and second channel data are paired and switched synchronously, and
the predictor configured to decode the first and second channel data based on the block information, the first and second channel data having been subdivided into the plurality of blocks according to the subdivision hierarchy, the subdivision hierarchy having more than one level, and at least two of the plurality of blocks in each channel for each level being capable of different lengths, wherein the length of the block information is based on the first subdivision information, the first subdivision information indicating whether the subdivision hierarchy includes one of up to three levels, four levels, and five levels,
if the first subdivision information is 01, the first subdivision information indicates the subdivision hierarchy includes up to three levels,
if the first subdivision information is 10, the first subdivision information indicates the subdivision hierarchy includes four levels, and
if the first subdivision information is 11, the first subdivision information indicates the subdivision hierarchy includes five levels;
an error checking part configured to verify whether an error is present in the decoded data;
an assembling part configured to assemble the decoded data into frame data;
a digital-to-analog D/A converter configured to convert the assembled frame data into an analog audio output signal; and
a speaker configured to output the converted analog audio output signal.

2. The audio player of claim 1, further comprising:
an inverse prediction filter configured to perform a filtering for the assembled frame data to calculate the lossless reconstruction signal.

3. The audio player of claim 1, wherein the block information corresponding to the first channel data and the block information corresponding to the second channel data are obtained independently when the first and second channel data are not paired.

* * * * *